Figure 1:
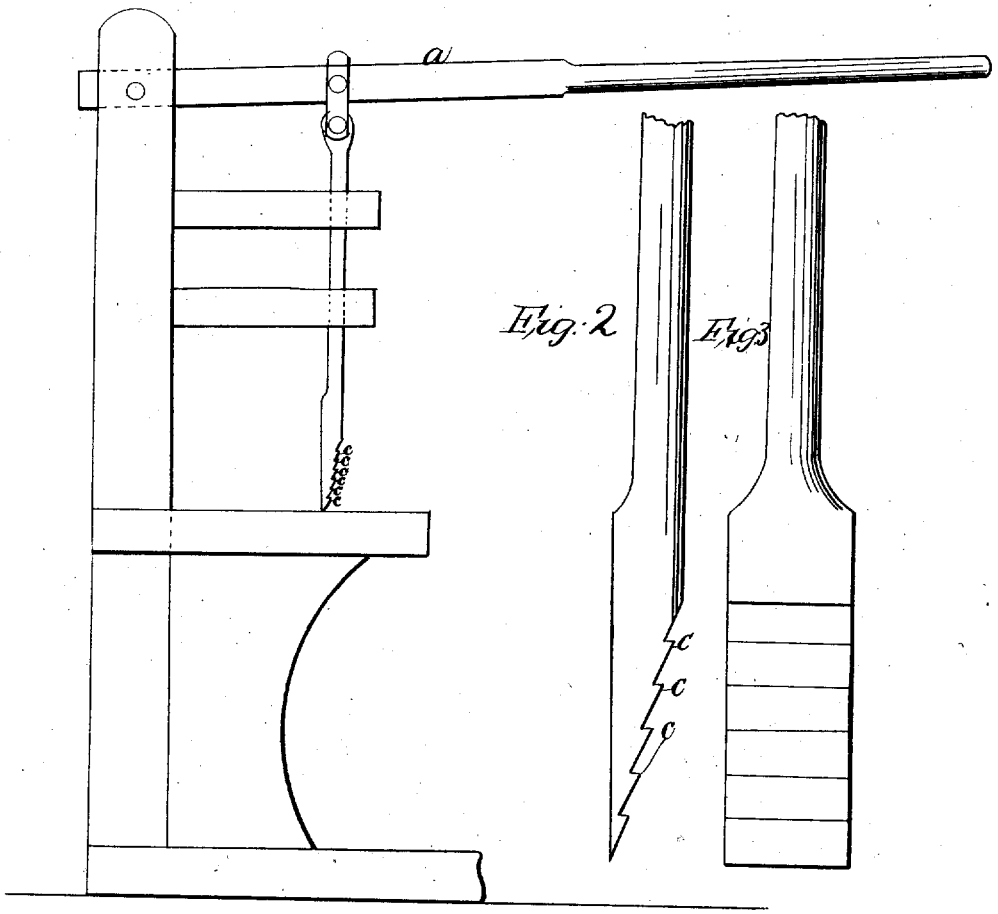

772X

Glover & Parmelee,
Mortising Machine.
Patented June 8, 1807.

AM. PHOTO-LITHO. CO. N.Y. (OSBORNE'S PROCESS)

182 [illegible]    772X

Simeon Glover and David Parmelee
Letters Patent   Patented June 8th 1807.

The schedule referred to in these Letters Patent and making part of the same, containing a description in the words of the said Simeon Glover and David Parmelee themselves of their Machine for Mortising.

The Mortising Machine is a chisel with teeth in the foreside of it. This Chisel is forced back and forth, or up & down (by a lever) through the timber or material to be mortised; and when crowded forward it cuts the mortise. The Lever is moved backward and forward, or up & down, by manual, animal or fluid power.

The principle of this Machine is to facilitate the labour & accelerate the making of Mortises by a chisel, that is put in motion by a Lever, which Lever is put in motion by manuel animal or Fluid Power The effect is, Mortices are made easier, quicker & more exact Witnesses
Eli Whitney
Peter Shepherd Simion Glover
David Parmelee Exd. M.G.C.    [illegible] (262 [illegible]